(12) United States Patent
Russell

(10) Patent No.: US 8,794,385 B2
(45) Date of Patent: Aug. 5, 2014

(54) LUBE INJECTION FOR FREE SOLIDS FLOW THROUGH A PUMP

(75) Inventor: Steven Craig Russell, Houston, TX (US)

(73) Assignee: General Electric Company, Schenectady, NY (US)

( * ) Notice: Subject to any disclaimer, the term of this patent is extended or adjusted under 35 U.S.C. 154(b) by 687 days.

(21) Appl. No.: 12/831,288

(22) Filed: Jul. 7, 2010

(65) Prior Publication Data
US 2012/0006624 A1  Jan. 12, 2012

(51) Int. Cl.
*F16N 13/22* (2006.01)
(52) U.S. Cl.
USPC ........................................ 184/15.2
(58) Field of Classification Search
USPC ........... 184/15.1, 15.2, 15.3, 16; 415/175, 90, 415/110; 138/114, 148
See application file for complete search history.

(56) References Cited

U.S. PATENT DOCUMENTS

| | | | | |
|---|---|---|---|---|
| 4,046,225 A | * | 9/1977 | Shenk | 184/15.1 |
| 4,116,505 A | * | 9/1978 | Stahlecker | 384/471 |
| 4,516,674 A | | 5/1985 | Firth | |
| 4,627,457 A | * | 12/1986 | Bird et al. | 137/1 |
| 4,749,059 A | * | 6/1988 | Jonnes et al. | 184/15.1 |
| 5,002,025 A | * | 3/1991 | Crouse | 123/196 M |
| 5,051,041 A | | 9/1991 | Firth | |
| 5,318,408 A | | 6/1994 | Davidsson | |
| 5,355,993 A | | 10/1994 | Hay | |
| 5,381,886 A | | 1/1995 | Hay | |
| 5,485,909 A | | 1/1996 | Hay | |
| 5,497,872 A | | 3/1996 | Pennino | |
| 5,551,553 A | | 9/1996 | Hay | |
| 5,558,473 A | * | 9/1996 | Lindahl | 406/61 |
| 5,632,356 A | * | 5/1997 | Sells | 184/15.2 |
| 6,213,289 B1 | | 4/2001 | Hay | |
| 6,227,768 B1 | * | 5/2001 | Higuchi et al. | 406/89 |
| 6,957,720 B2 | * | 10/2005 | Kuo | 184/15.1 |
| 7,704,314 B2 | | 4/2010 | Inglese et al. | |
| 2009/0072081 A1 | * | 3/2009 | Regonini et al. | 244/60 |

* cited by examiner

*Primary Examiner* — William E Dondero
*Assistant Examiner* — Mark K Buse
(74) *Attorney, Agent, or Firm* — Cooper Legal Group

(57) ABSTRACT

A lubricating pump system and a lubrication injection apparatus for a pump of such a system. The pump conveys material, including bulk solids material. A lubricant reservoir stores a lubricant. The lubrication injection apparatus delivers lubricant from the lubricant reservoir to a surface portion of the pump along which material is conveyed.

18 Claims, 5 Drawing Sheets

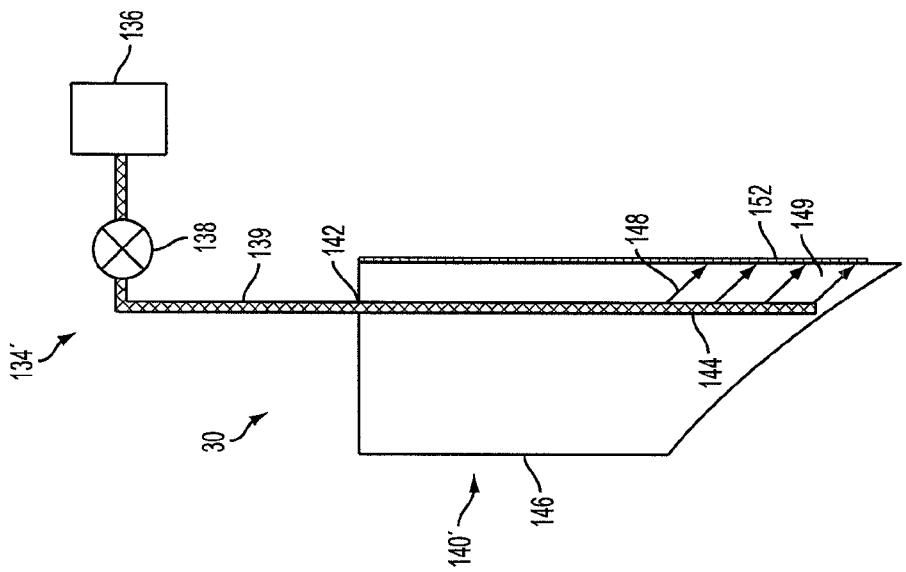
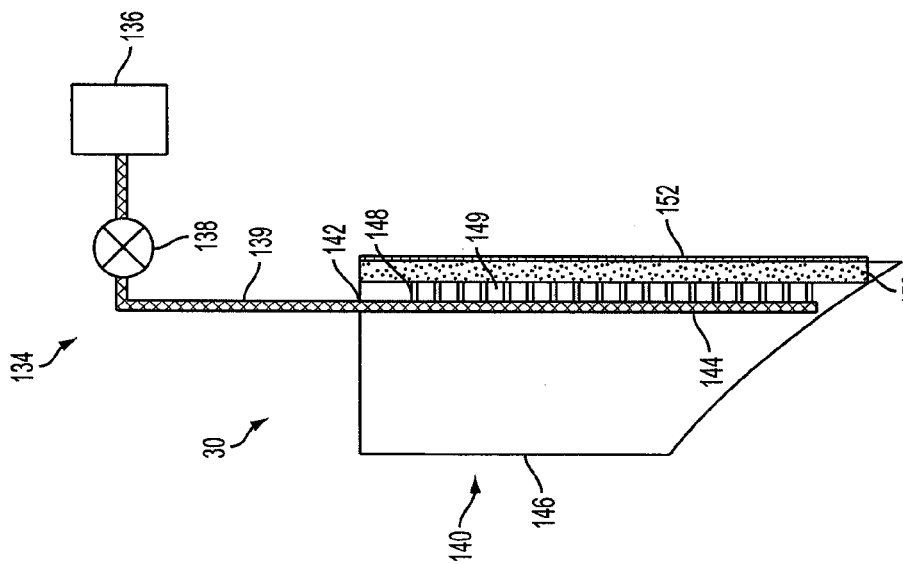

LUBE INJECTION FOR FREE SOLIDS FLOW THROUGH A PUMP

BACKGROUND OF THE INVENTION

1. Field of the Invention

The invention relates to pump applications for transporting material, and more particularly, to a lubrication device that reduces friction in pump applications.

2. Discussion of Prior Art

Pumps, including posimetric pumps, may be used to either transport or meter material, such as coal, biomass, food products, sawdust, etc. Posimetric pumps rely on solids-lock up to deliver material to the outlet of the pump. However, the outlet of the pump may become highly compacted with material due to the geometry of the exit and the high pressure gas load. The high compaction results in large forces on the walls of the pump, leading to high torque and high wear rates. Therefore, it would be useful to have a pump that is lubricated to reduce the loads on the walls without negatively affecting the performance of solids lock-up, sealing ability, or the like.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a lubricating pump system. The system includes a pump for conveying material, a lubricant reservoir for storing a lubricant, and a lubrication injection apparatus for delivering lubricant from the lubricant reservoir to a surface portion of the pump along which material is conveyed.

In accordance with another aspect, the present invention provides a lubrication injection apparatus for a pump. The lubrication injection apparatus includes a surface portion which also provides part of the pump along which material is conveyed by the pump, a lubricant reservoir for storing a lubricant, and means for delivering lubricant from the lubricant reservoir to the surface portion along which material is conveyed.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 5 is a sectional view of a first example abutment member of the lubricating pump system of FIG. 1, with a lubrication injection apparatus having a porous sintered layer at the abutment member and with some components schematically shown;

FIG. 6 is a sectional view of a second example abutment member of the lubricating pump system of FIG. 1, with a lubrication injection apparatus having a plate with lubrication ports at the abutment member and with some components schematically shown;

DETAILED DESCRIPTION OF THE INVENTION

Figure 1:
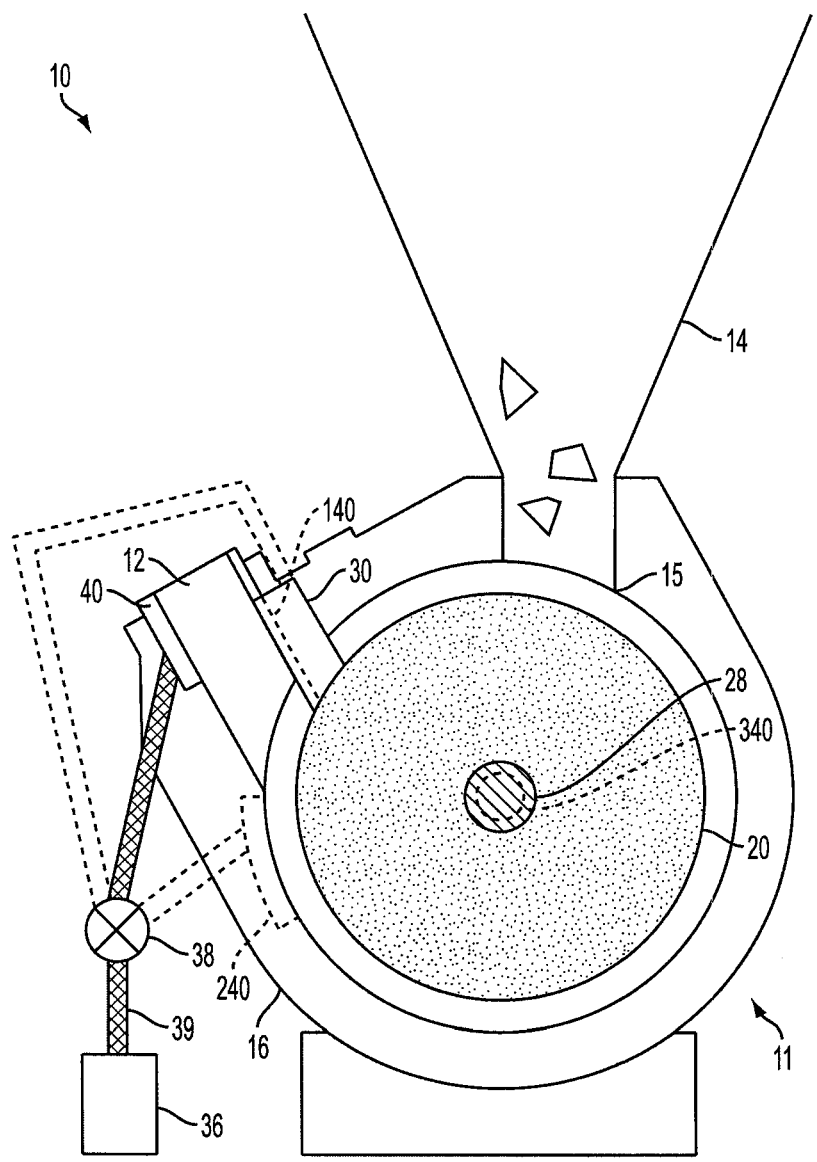
FIG. 1 is a sectional side view of an example lubricating pump system with some components schematically shown.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 illustrates an example lubricating posimetric pump system according to one aspect of the invention. An example embodiment of a lubricating pump system 10 includes a pump 11 that can be used to transport and meter solid material flowing from a hopper 14, through an inlet 15 to an outlet 12 of the lubricating pump system 10. The lubricating pump system 10 may further include a housing 16 containing a rotor assembly 18 for rotating one or more disks 20. Solid material can flow from the hopper 14 and is transported by the one or more disks 20, causing the solid material to be transported towards the outlet 12 in some cases into a region of high gas pressure.

The solid material may include coal, coke, biomass, sawdust, or any other type of solid/semi-solid material. The lubricating pump system 10 can include a number of different embodiments, depending on the application. For instance, the lubricating pump system 10 can include a bulk solids pump, such as a Posimetric pump, or any other type of solid feeding device.

The lubricating pump system 10 includes the hopper 14 that feeds material into the inlet 15 of the lubricating pump system 10. The hopper 14 is substantially funnel shaped, such that material will continuously fall into the inlet. The lubricating pump system 10 is not limited to the hopper 14 as shown, however. In other examples, the hopper 14 may have a variety of shapes or be replaced with a feeder, or the like. The inlet 15 is positioned substantially below the hopper 14 and above the housing 16. The inlet 15 defines an opening for allowing material to freely fall into the housing 16 under the influence of gravity.

Figure 2:
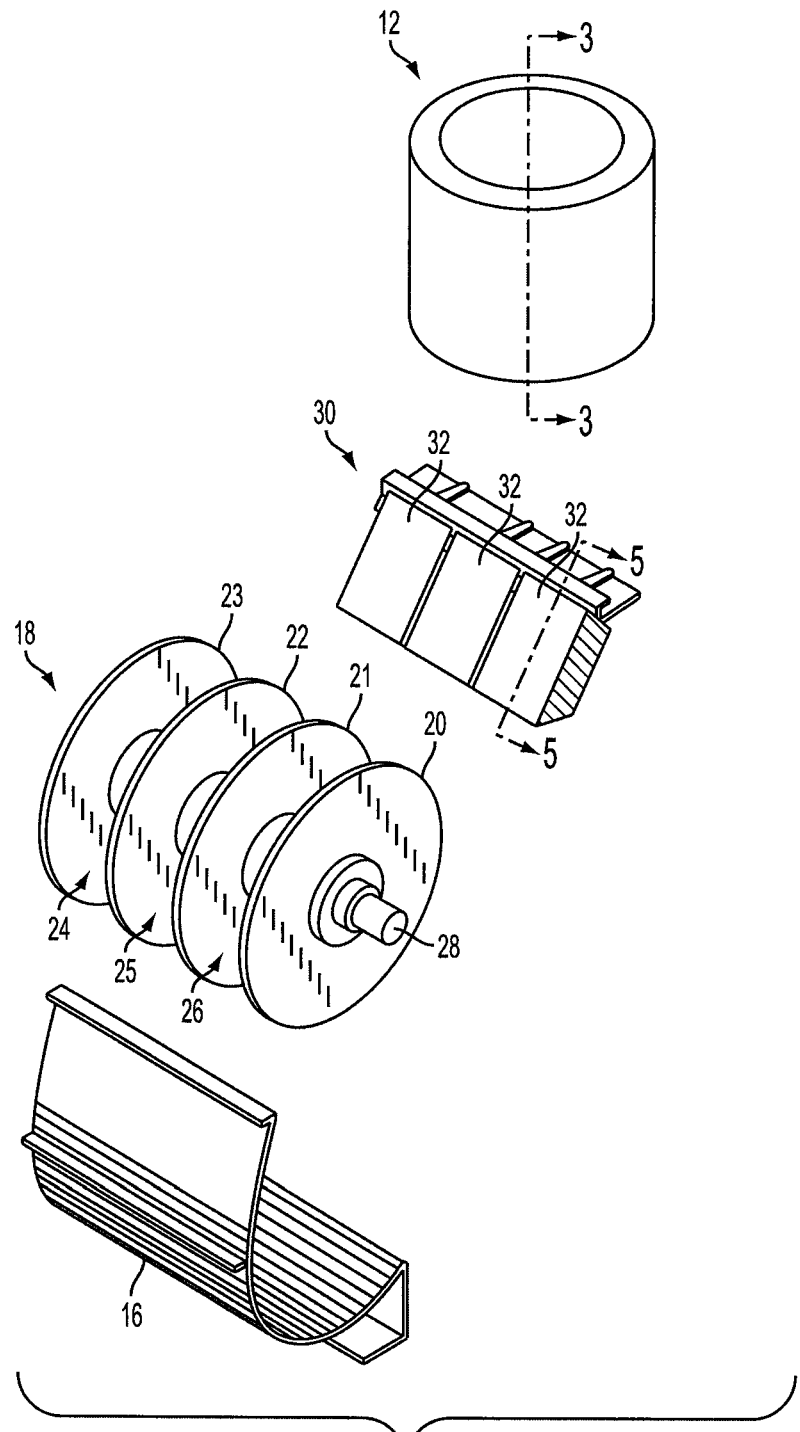
FIG. 2 is an exploded view of portions of the example lubricating pump system of FIG. 1 and shows an example multiple channel drive rotor assembly.

The rotor assembly 18 may be positioned within the housing 16 substantially below the inlet 15 and hopper 14. As shown in FIG. 2, the rotor assembly 18 may include a rotor 28 that is generally cylindrically shaped extending through disks 20-23. The disks 20-23 may be fixedly secured to the rotor 28 or formed integrally therewith. Thus, rotation of the rotor 28 causes the disks 20-23 to rotate as well. A portion of the rotor 28 may extend beyond the disks for coupling to a drive transmission device (not shown) or the like. The rotor 28 may be rotated by the drive transmission device, causing rotation of the disks 20-23.

Referring still to FIG. 2, the disks 20-23 define three transport channels 24-26 formed there between. Each transport channel is positioned between a pair of disks and bordered on an outer diameter by the housing 16 and on an inner diameter by the rotor 28. Thus, any solid material in the housing 16 is surrounded on all four sides and substantially remains within a transport channel. Though four disks 20-23 are shown in FIG. 2, it is to be understood that any number of disks are contemplated. For instance, the rotor assembly 18 may include two disks with one transport channel formed there between, three disks with two transport channels formed there between, etc.

The rotor 28 may be rotated by a drive transmission device, causing the disks 20-23 mounted on the rotor 28 to rotate as well. The disks 20-23 and rotor 28 rotate relative to the housing 16, which remains stationary. Therefore, solid material may be introduced through the inlet 15 and drop into the transport channels 24-26 of the rotor assembly 18. The moving disks 20-23 may cause the solid material to inter-lock and form a bridge across the transport channels 24-26. As the materials interlock with each other and bridge across the transport channels 24-26, the materials form a solid mass of substantially interlocked materials. The solid mass simultaneously engages the disks 20-23. Thus, the rotation of the disks 20-23 is transported to the solid mass, causing the materials to rotate with the disks 20-23. The solid mass is driven towards the outlet 12 of the lubricating pump system 10.

As shown in FIG. 2, the lubricating pump system 10 may further include an abutment member 30. The abutment member 30 may be positioned adjacent the outlet 12, such that the abutment member 30 is angled to direct the moving solid mass from the transport channels 24-26 to the outlet 12. A range of angles is possible, however, and the abutment member 30 is not limited to the angle as shown. The abutment member 30 may include an abutment surface 32 separated into individual surfaces by slots. Each of the disks 20-23 may extend into a corresponding slot such that each abutment surface 32 fits within the transport channels 24-26. In the shown example, the abutment member 30 is separated into three separate surfaces that corresponding to three transport channels 24-26. However, as with the disks 20-23 described above, more or less abutment surfaces are contemplated. Each abutment surface 32 acts to direct solid mass from a transport channel in the rotor assembly 18 to the outlet 12. The solid mass is rotated within the housing 16 and will come into contact with an abutment surface 32 near the outlet. The angle of the abutment surface 32 directs the solid mass from the one of the transport channels 24-26 to the outlet 12.

The outlet 12 may have a number of different shapes and sizes, depending on the application. For instance, the outlet 12 may be cylindrical, oval, rectangular, etc. Similarly, the outlet 12 may have a larger diameter to accommodate larger materials or loads, or in other embodiments, may have a smaller diameter for smaller materials or loads. Materials directed by the abutment member 30 towards the outlet 12 will pass through the outlet 12 and exit the lubricating pump system 10. However, the outlet 12 could have a tendency to become highly compacted with solid material due to a number of factors, including the geometry of the outlet 12, the presence of a high pressure gas load, etc. Furthermore, contact between the solid material and the walls of the outlet 12 could leads to problems, including friction, wear and tear at the pump walls, inefficiency, etc. Therefore, to minimize torque and wear rates, the lubricating pump system 10 includes a lubrication injection apparatus 34 for providing lubrication for at least one location (e.g., a surface portion of the pump 11 along which material is conveyed) where the solid material generates high forces, such as at the outlet 12, the abutment member 30, or other locations.

Though not shown in the drawings, one or more vents may be provided in the lubricating pump system 10. For instance, a vent may be provided at the outlet 12 to equalize pressure in the lubricating pump system 10. As solid material travels through the lubricating pump system 10, pressure may build up in the rotor assembly 18 or transport channels 24-26. Pressure buildup may interfere with the solid material entering from the hopper 14. Therefore, vents may act to reduce any pressure buildup in the lubricating pump system 10, thus ensuring a steady supply of solid material from the hopper 14.

Figure 4:
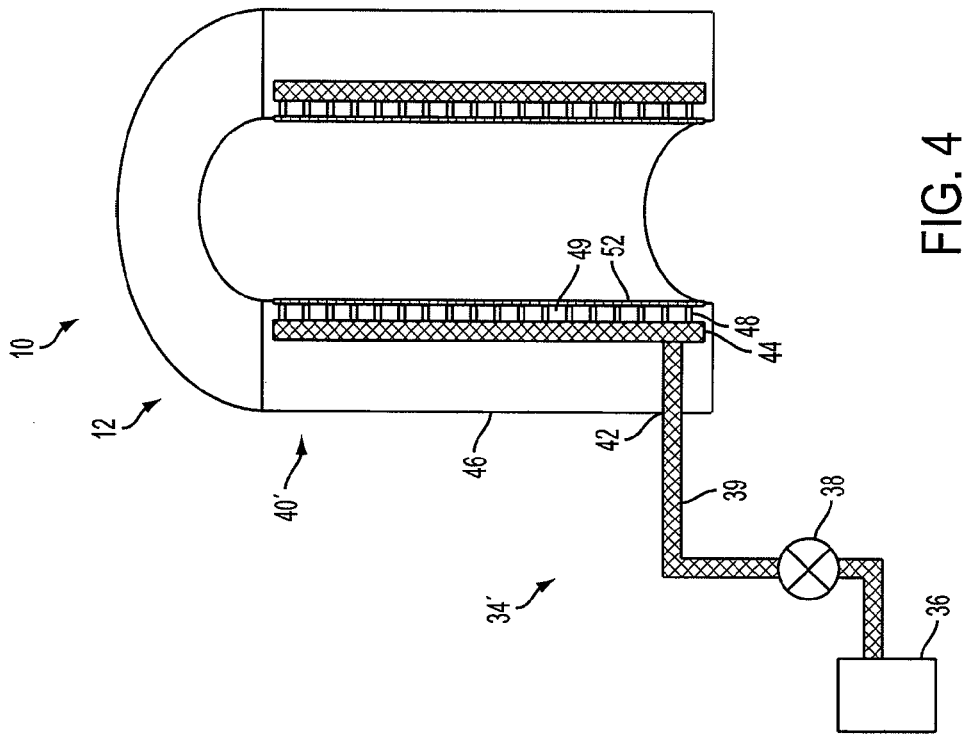
FIG. 4 is a sectional view of a second example outlet of the lubricating pump system of FIG. 1, with a lubrication injection apparatus having a plate with lubrication ports at the outlet and with some components schematically shown.
Figure 3:
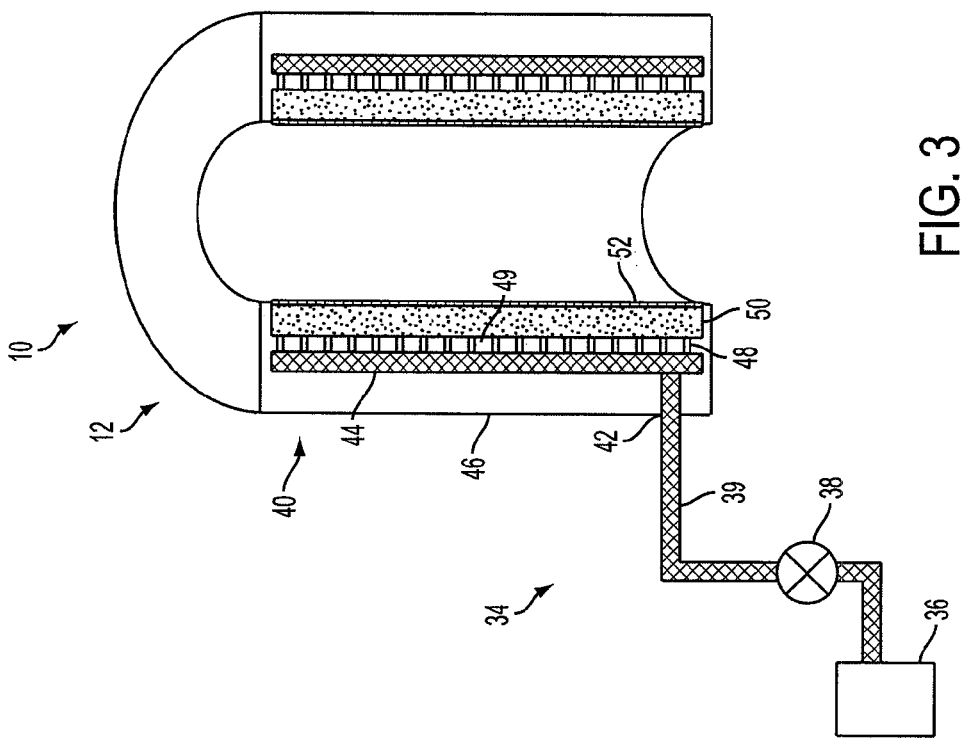
FIG. 3 is a sectional view of a first example outlet of the lubricating pump system of FIG. 1, with a lubrication injection apparatus having a porous sintered layer at the outlet and with some components schematically shown.

Referring now to FIGS. 3 and 4, examples of the lubrication injection apparatus 34 (34' in FIG. 4) within the lubricating pump system 10 are shown. It is to be appreciated that the shown examples of the lubrication injection apparatus 34 do not necessarily limit the present invention and that other examples are within the scope of the present invention. The lubrication injection apparatus 34 supplies lubricant at one or more locations within the lubricating pump system 10 to aid in the flow of material being moved by the pump 11 of the lubricating pump system 10. The lubricant is provided at the location via a lubrication injector 40 (40' in FIG. 4) of the lubrication injection apparatus 34. In the shown examples of FIGS. 3 and 4, the lubrication injector 40 (40' in FIG. 4) is provided at a surface portion of the outlet 12. However, as will be described below, the lubrication injector 40 can be provided at other high wear rate locations, such as at the abutment member 30, one or locations of the housing 16, or one or more locations of the rotor 28. The outlet 12 is one example of a static (non-moving) portion of the pump 11.

Referring now to FIG. 3, the lubrication injection apparatus 34 also includes a lubricant reservoir 36 and a lubricant pump 38. The lubrication injector 40 is in fluid communication with the lubricant reservoir 36 via the lubricant pump 38 and an associated lubricant conduit 39. The lubricant conduit 39 may be a pipe, hose, or the like, and provides a conduit for transportation of lubricant from the lubricant reservoir 36 to the lubrication injector 40. The lubricant reservoir 36 may be provided as an external structure to pump 11 of the lubricating pump system 10 or may be attached to the pump 11. The lubricant reservoir 36 is adapted to hold and store lubricant and may have a size selected depending on the amount of lubricant needed.

As indicated, the lubricant pump 38 is in communication with the lubricant reservoir 36. The lubricant pump 38 pumps lubricant from the lubricant reservoir 36 to the lubrication injector 40. It is to be understood, however, that various structures capable of controlling flow could replace/supplement the lubricant pump 38. For instance, valves or other flow regulation devices could replace/supplement the lubricant pump 38. The lubricant pump 38 and the lubricant conduit 39 are at least part of one example means for delivering lubricant from the lubricant reservoir 36 to the lubrication injector 40 and the surface portion along which material is conveyed.

As shown in FIG. 3, the lubrication injector 40 is adapted to receive and inject lubricant into the pump 11 of lubricating pump system 10. In the shown example, the lubrication injector 40 includes a portion of the pump 11 that is a casing 46 of the outlet 12 with lubrication structures formed therein. The casing 46 may be the same structure as the outlet 12. An inlet 42 is formed in the casing 46 extending from an outer surface and into the casing. The inlet 42 is in fluid communication with the lubricant reservoir 36/lubricant pump 38 along the lubricant conduit 39. The inlet 42 may include a number of different shapes and sizes depending on the type of lubricant used, amount of lubricant to be delivered, etc. While the inlet 42 is positioned at an end of the casing 46 in FIG. 3, it is to be understood that the inlet 42 may be positioned almost anywhere along the casing 46. For instance, the inlet 42 may be positioned closer to the middle of the casing 46, at the opposite end of the casing 46, extending into the side of the casing 46, etc. Similarly, the inlet 42 may be a single inlet, a plurality of inlets, and may extend completely or partially around the outlet.

The inlet 42 is in fluid communication with a manifold 44. The manifold 44 is designed to receive lubricant from the inlet 42 and distribute the lubricant substantially evenly along the length of the casing 46 (lubrication injector 40). The manifold 44 may extend partially or completely (as shown in FIG. 3) along the length of the casing 46. Similarly, the manifold 44 may extend partially or completely around the circumference of the casing 46. The manifold 44 may also be multiple manifolds formed in the casing 46, such as multiple manifolds with one or more inlets. As with the inlet 42, the manifold 44 may have a number of different shapes and sizes depending on the configuration of the casing, type of lubricant used, amount of lubricant to be delivered, etc.

The manifold 44 is in fluid communication with one or more lubrication ports 48. The lubrication ports 48 are designed to receive lubricant from the manifold 44 and distribute the lubricant evenly. The lubrication ports 48 may be formed as perforations in a plate 49. For instance, perforations, holes, or the like may be formed in the plate 49 and extend completely through the plate 49. The lubrication ports 48 may have a number of sizes and shapes, such as a circle, oval, square, slot, triangle, etc. During manufacture, once the perforations have been made, the plate 49 can be attached to the manifold 44. The attachment may be a removable attachment, if there is a desire to allow later removal and replacement. As shown, the plate 49 may be sized to match the size of the manifold 44, such that if the manifold 44 extends along substantially the entire length of the casing 46, the plate 49 will also extend along substantially the entire length of the casing 46. Similarly, if the manifold 44 extends only partially along the length of the casing 46, the plate 49 will closely match the length of the manifold 44. Moreover, if the manifold 44 extends around an inner diameter of an outlet, for instance, the plate 49 will be substantially circular such that it wraps around the inner diameter of the manifold 44. The manifold 44 may wrap completely or only partially around the inner diameter of an outlet.

As described above, the perforations in the plate 49 provide the lubrication ports 48. The lubrication ports 48 may be positioned between the manifold 44 and a porous sintered layer 50. Thus, the lubrication ports 48 are in fluid communication with the manifold 44 on one side, and the porous sintered layer 50 on an opposite side. The lubrication ports 48 are adapted to allow lubricant to pass evenly from the manifold 44, through the lubrication ports 48, and to the porous sintered layer 50.

Referring still to FIG. 3, the porous sintered layer 50 is in fluid communication with the lubrication ports 48. The porous sintered layer 50 includes a plurality of pores extending completely through the layer between opposite surfaces, thus allowing the lubricant to permeate through the porous sintered layer 50. The average size of the pores in the porous sintered layer 50 may vary depending on the application. For instance, the pore size may be in the range of 1.0 microns to 10.0 microns. For applications requiring a very low lubricant flow through the porous sintered layer 50, the average pore size of the porous sintered layer 50 may be closer to the low end of the range, such as 1.0 to 3.0 microns. For applications requiring a greater lubricant flow through the porous sintered layer 50, the average pore size of the porous sintered layer 50 may be closer to the high end of the range, such as up to 10.0 microns. The pore size of the porous sintered layer 50 allows for lubricant passing from the lubrication ports 48 to be substantially evenly distributed along the length of the porous sintered layer 50. The pore size of the porous sintered layer 50 is small enough, however, to prevent solid material from clogging the pores, thus ensuring a constant flow of lubricant through the porous sintered layer 50.

The porous sintered layer 50 may be made of a number of materials, such as stainless steel, carbon steel, bronze, higher alloys, etc. The thickness of the porous sintered layer 50 also may vary depending on the application, such as in the range of 1/8" to 1/2". As with the average pore size, thickness of the porous sintered layer 50 may be varied to contribute to variation of volume of lubricant flow. The porous sintered layer 50 may be provided as a sintered mesh material that allows for lubricant to pass from the lubrication ports 48 through the porous sintered layer 50.

The porous sintered layer 50 is positioned adjacent to the inner diameter of the plate 49. The porous sintered layer 50 may be removably attached to the plate 49 by an attachment means, such as a screw, adhesive, clamping, or the like. Such removability may allow for later removal and replacement. The plate 49 provides structural support and rigidity such that when material comes into contact with the porous sintered layer 50 wear is limited.

Referring still to FIG. 3, the operation of the example lubrication injection apparatus 34 will now be described. As described above, lubricant stored in the lubricant reservoir 36 is pumped by the lubricant pump 38 along the lubricant conduit 39. The lubricant conduit 39 is in fluid communication with the inlet 42 such that lubricant is delivered to the inlet 42. Lubricant passes through the inlet 42 and may collect in the manifold 44 along the length of the casing 46. Lubricant accumulated in the manifold 44 may then pass through the one or more lubrication ports 48. Upon exiting the lubrication ports 48, lubricant passes through the porous sintered layer 50 and forms a lubricant film surface 52. The lubricant film surface 52 may substantially coat the interior surface portion of the casing 46 and provide lubrication at the wall location of the outlet 12 (e.g., a surface portion of the pump 11 along which material is transported/conveyed) where the solid materials generate high forces. Friction between the solid material and wall locations is therefore reduced.

Referring now to FIG. 4, a second example of a lubrication injection apparatus 34' is shown. In this example, the lubrication injector 40' of the lubrication injection apparatus 34' is provided without a porous sintered layer. The inlet 42, manifold 44, lubrication ports 48, and plate 49 can be identical or substantially similar to the example lubrication injector 40 in FIG. 3 and thus the same reference numerals are used. Also, the lubricant reservoir 36, the lubricant pump 38 and the lubricant conduit 39 can be identical or substantially similar so the same reference numerals are used. The lubricant pump 38 and the lubricant conduit 39 are at least part of one example means for delivering lubricant from the lubricant reservoir 36 to the lubrication injector 40 and the surface portion along which material is conveyed.

In this example, lubricant is pumped by the lubricant pump 38 from the lubricant reservoir 36 along the lubricant conduit 39 to the inlet 42. However, valves or other flow regulation devices may supplement/replace the lubricant pump. Lubricant enters the lubrication injector 40' through the inlet 42 and may collect in the manifold 44. The manifold 44 may extend partially or completely along the length of the casing 46 and partially or completely around the casing 46. Lubricant may accumulate in the manifold 44 and pass through the one or more lubrication ports 48. As with the previous example, the lubrication ports 48 are formed in the plate 49, which can be attached to the surface of the manifold 44. Lubricant exiting the lubrication ports 48 may then accumulate on the surface of the plate 49. Thus, the lubricant film surface 52 is formed on the surface of the plate 49. The lubricant film surface 52 may substantially coat the interior surface portion (e.g., a surface portion of the pump 11 along which material is transported/conveyed) of the outlet 12 to provide lubrication at the wall location of the outlet 12 where solid material generates high forces.

Referring now to FIG. 5, a cross-sectional, partially schematic view of a third example of a lubrication injection apparatus 134 is shown. In this example, a lubrication injector 140 is positioned in the abutment member 30, such that lubricant is injected at the abutment surface 32. Thus, a lubricant film surface 152 can be formed on the abutment surface 32 (e.g., a surface portion of the pump 11 along which material is transported/conveyed). The abutment member 30 may be adjustable and thus can be considered to at least be moveable.

As with the previous examples, lubricant may be pumped by a lubricant pump 138 from a lubricant reservoir 136. The lubricant reservoir 136 may be provided as an external structure to the pump 11 of the lubricating pump system 10, or may be attached to the pump 11. The lubricant reservoir 136 is adapted to hold and store lubricant, and can be of varied size. The lubricant pump 138 pumps lubricant from the lubricant reservoir 136 to the lubrication injector 140. Various structures are capable of controlling flow that could replace/supplement the lubricant pump 138, such as valves or other flow regulation devices. A lubricant conduit 139, such as a pipe, hose, or the like is provided for transporting lubricant from the lubricant reservoir 136 to the lubrication injector 140. The lubricant pump 138 and the lubricant conduit 139 are at least part of one example means for delivering lubricant from the lubricant reservoir 36 to the lubrication injector 140 and the surface portion along which material is conveyed. Also, although different reference numerals are used as compared to previous examples, the structures may be identical or different as compared to the previous examples.

As shown in FIG. 5, the lubrication injector 140 is adapted to receive and inject lubricant into the lubricating pump system 10. The lubrication injector 140 includes a casing 146 of the abutment member 30 with lubrication structures provided therein. The casing 146 may be the same structure as the abutment member 30. In the shown example, the lubrication injector 140 is configured to provide the lubricant film surface 152 on the abutment surface 32 (see FIG. 1). As such, an inlet 142 (FIG. 5) is formed in the abutment member 30. The inlet 142 is shown to be positioned at the top of the abutment member 30, but it is understood that it may be positioned in a number of locations, such as at the rear, along a side, or from the bottom of the abutment member 30. Moreover, the inlet 142 may be a single inlet, a plurality of inlets, etc.

Referring still to FIG. 5, the inlet 142 is in fluid communication with a manifold 144. As with previous examples, the manifold 144 is designed to receive lubricant from the inlet 142 and distribute the lubricant substantially evenly along the length and width of the abutment surface 32. The manifold 144 may extend partially or completely (as shown in FIG. 3) along the length and width of the abutment member 30. As with the inlet 142, the manifold 144 may have a number of different shapes and sizes depending on the type of lubricant used, amount of lubricant to be delivered, etc.

The manifold 144 is in fluid communication with one or more lubrication ports 148. The lubrication ports 148 are designed to receive lubricant from the manifold 144 and distribute the lubricant evenly. The lubrication ports 148 may be formed as perforations in a plate 149. The plate 149 may be substantially rectangular shaped, though other shapes are contemplated, such as a square shape, circle shape, etc. Perforations, holes, or the like may be formed in the plate 149 and extend completely through the plate 149. Once the perforations have been made, the plate 149 can be removably attached to the manifold 144. As shown, the plate 149 may be sized to match the size of the manifold 144, such that if the manifold 144 extends along substantially the entire length and width of the abutment member 30, the plate 149 will also extend along substantially the entire length and width of the abutment member 30. Similarly, if the manifold 144 extends only partially along the length and width of the abutment member 30, the plate 149 will closely match the length of the manifold 144.

As with the previous example, the perforations in the plate 149 provide the lubrication ports 148. The lubrication ports 148 are positioned between the manifold 144 and a porous sintered layer 150. Thus, the lubrication ports 148 are in fluid communication with the manifold 144 on one side, and a porous sintered layer 150 on an opposite side. The lubrication ports 148 are adapted to allow lubricant to pass evenly from the manifold 144, through the lubrication ports 148, and to the porous sintered layer 150.

The porous sintered layer 150 is in fluid communication with the lubrication ports 148. The porous sintered layer 150 may include a sintered mesh material allowing for lubricant to pass from the lubrication ports 148 through the porous sintered layer 150. The porous sintered layer 150 may be removably attached to the plate 149 by an attachment means, such as a screw, adhesive, or the like. The plate 149 again provides structural support and rigidity to limit wear and tear of the porous sintered layer 150. The porous sintered layer 150 may be made of a number of materials, such as stainless steel, carbon steel, bronze, higher alloys, etc.

The porous sintered layer 150 includes a plurality of pores extending completely through the layer between opposite surfaces, thus allowing the lubricant to permeate through the porous sintered layer 150. As with the previous example, the average size of the pores in the porous sintered layer 150 may vary depending on the application. For instance, the pore size may be in the range of 1.0 microns to 10.0 microns. Similarly, the thickness of the porous sintered layer 150 also may vary depending on the application, such as in the range of ⅛" to ½". Applications requiring a low lubricant flow may use a porous sintered layer 150 that is thinner or has a smaller pore size. Conversely, applications requiring a high lubricant flow may use a porous sintered layer 150 that is thicker or has a larger pore size.

The operation of the example lubrication injection apparatus 134 for injecting lubricant at the abutment member 30 will now be described. Lubricant stored in the lubricant reservoir 136 is pumped by the lubricant pump 138 along the lubricant conduit 139 to the inlet 142. Lubricant passes through the inlet 142 into the abutment member 30. Lubricant collects in the manifold 144 along the length of the abutment member 30. Lubricant from the manifold 144 may then pass through the one or more lubrication ports 148 and through the porous sintered layer 150. Lubricant exiting the porous sintered layer 150 accumulates to form the lubricant film surface 152 on the abutment surface 32. The lubricant film surface 152 may substantially coat the abutment surface 32 and provide lubrication where the solid materials generate high forces. Friction between the solid material and abutment member 30 is therefore reduced. Furthermore, lubricant from the lubricant film surface 152 may coat the solid material upon coming into contact, such that the solid material passes through the outlet 12 with a thin coating of lubricant. The thin coating of lubricant may assist in reducing friction between the solid material and outlet 12.

Referring now to FIG. 6, yet another example of a lubrication injection apparatus 134' is shown. In this example, the lubrication injection apparatus 134' is provided without a porous sintered layer. The inlet 142, manifold, 144, lubrication ports 148, and plate 149 are identical or substantially similar to the example lubrication injection apparatus 134 in FIG. 5. Thus identical reference numerals are used. In this example, lubricant may be pumped by the lubricant pump 138 from the lubricant reservoir 136 along the lubricant conduit 139 to the inlet 142. Again, same reference numerals are used for identical/similar structures. Lubricant enters the lubrication injector 140' through the inlet 142 and collects in the manifold 144. The manifold 144 may extend partially or completely along the length of the abutment member 30.

Lubricant may accumulate in the manifold 144 and pass through the one or more lubrication ports 148. The lubrication ports 148 are formed in a plate 149, which can be attached to the surface of the manifold 144. The lubrication ports 148 may have a number of shapes and sizes. For instance, the lubrication ports 148 may be angled, as shown, or may extend perpendicular to the manifold 144. Similarly, the lubrication ports 148 may be shaped as a circle, oval, square, slot, triangle, etc. depending on the application. Lubricant exiting the lubrication ports 148 may then accumulate on the surface of the plate 149. The lubricant film surface 152 is formed on the surface of the plate 149, thus ensuring a coating of lubricant on the abutment surface 32 (e.g., a surface portion of the pump 11 along which material is transported/conveyed).

Examples of the lubrication injection apparatus shown in FIGS. 3 and 4 are adapted for use in the outlet 12 of the lubricating pump system 10. Examples of the lubrication injection apparatus shown in FIGS. 5 and 6 are adapted for use in the abutment member 30 of the lubricating pump system 10. However, it is to be understood that the lubrication injection apparatus could be placed at other locations within the lubricating pump system 10.

Figure 7:
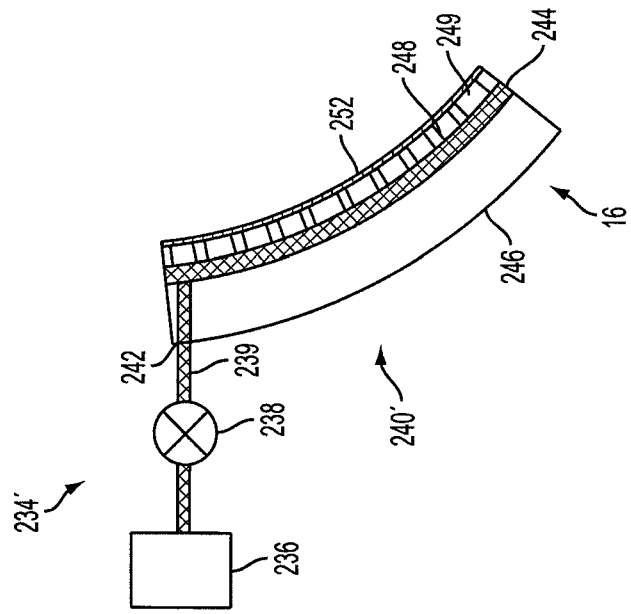
FIG. 7 is a sectional view of a first example housing of the lubricating pump system of FIG. 1, with a lubrication injection apparatus having a porous sintered layer at the housing and with some components schematically shown.

Referring now to FIG. 7, a cross-sectional, partially schematic view of a fifth example of a lubrication injection apparatus 234 is shown. In this example, a lubrication injector 240 is positioned in the housing 16, such that lubricant is injected at a surface portion of the housing 16. Thus, a lubricant film surface 252 can be formed on the housing 16 (e.g., a surface portion of the pump 11 along which material is transported/conveyed).

As with the previous examples, lubricant may be pumped by a lubricant pump 238 from a lubricant reservoir 236. The lubricant reservoir 236 may be provided as an external structure to the pump 11 of the lubricating pump system 10, or may be attached to the pump 11. The lubricant reservoir 236 is adapted to hold and store lubricant, and can be of varied size. The lubricant pump 238 pumps lubricant from the lubricant reservoir 236 to the lubrication injector 240. Various structures are capable of controlling flow that could replace/supplement the lubricant pump 238, such as valves or other flow regulation devices. A lubricant conduit 239, such as a pipe, hose, or the like is provided for transporting lubricant from the lubricant reservoir 236 to the lubrication injector 240. The lubricant pump 238 and the lubricant conduit 239 are at least part of one example means for delivering lubricant from the lubricant reservoir 36 to the lubrication injector 240 and the surface portion along which material is conveyed. Also, although different reference numerals are used as compared to previous examples, the structures may be identical or different as compared to the previous examples.

As shown in FIG. 7, the lubrication injector 240 is adapted to receive and inject lubricant into the lubricating pump system 10. The lubrication injector 240 includes a casing 246 of the housing 16 with lubrication structures provided therein. The casing 246 may be the same structure as the housing 16. In the shown example, the lubrication injector 240 is configured to provide the lubricant film surface 252 on a surface of the housing 16 (see FIG. 1). As such, an inlet 242 (FIG. 7) is formed in the housing 16. The inlet 242 is shown to be positioned towards the top of the housing 16, but it is understood that it may be positioned in a number of locations, such as at the rear, along a side, or from the bottom of the housing 16. Moreover, the inlet 242 may be a single inlet, a plurality of inlets, etc.

Referring still to FIG. 7, the inlet 242 is in fluid communication with a manifold 244. As with previous examples, the manifold 244 is designed to receive lubricant from the inlet 242 and distribute the lubricant substantially evenly along the length and width of the housing 16. The manifold 244 may extend partially or completely (as shown in FIG. 3) along the length and width of the housing 16. As with the inlet 242, the manifold 244 may have a number of different shapes and sizes depending on the type of lubricant used, amount of lubricant to be delivered, etc.

The manifold 244 is in fluid communication with one or more lubrication ports 248. The lubrication ports 248 are designed to receive lubricant from the manifold 244 and distribute the lubricant evenly. The lubrication ports 248 may be formed as perforations in a plate 249. The plate 249 may be substantially rectangular shaped, though other shapes are contemplated, such as a square shape, circle shape, etc. Perforations, holes, or the like may be formed in the plate 249 and extend completely through the plate 249. Once the perforations have been made, the plate 249 can be removably attached to the manifold 244. As shown, the plate 249 may be sized to match the size of the manifold 244, such that if the manifold 244 extends along substantially the entire length and width of the housing 16, the plate 249 will also extend along substantially the entire length and width of the housing 16. Similarly, if the manifold 244 extends only partially along the length and width of the housing 16, the plate 249 will closely match the length of the manifold 244.

As with the previous example, the perforations in the plate 249 provide the lubrication ports 248. The lubrication ports 248 are positioned between the manifold 244 and a porous sintered layer 250. Thus, the lubrication ports 248 are in fluid communication with the manifold 244 on one side, and a porous sintered layer 250 on an opposite side. The lubrication ports 248 are adapted to allow lubricant to pass evenly from the manifold 244, through the lubrication ports 248, and to the porous sintered layer 250.

The porous sintered layer 250 is in fluid communication with the lubrication ports 248. The porous sintered layer 250 may include a sintered mesh material allowing for lubricant to pass from the lubrication ports 248 through the porous sintered layer 250. The porous sintered layer 250 may be removably attached to the plate 249 by an attachment means, such as a screw, adhesive, clamp or the like. The plate 249 again provides structural support and rigidity to limit wear and tear of the porous sintered layer 250. The porous sintered layer 250 may be made of a number of materials, such as stainless steel, carbon steel, bronze, higher alloys, etc.

The porous sintered layer 250 includes a plurality of pores extending completely through the layer between opposite surfaces, thus allowing the lubricant to permeate through the porous sintered layer 250. As with the previous example, the average size of the pores in the porous sintered layer 250 may vary depending on the application. For instance, the pore size may be in the range of 1.0 microns to 10.0 microns. Similarly, the thickness of the porous sintered layer 250 also may vary depending on the application, such as in the range of ⅛" to ½". Applications requiring a low lubricant flow may use a porous sintered layer 250 that is thinner or has a smaller pore size. Conversely, applications requiring a high lubricant flow may use a porous sintered layer 250 that is thicker or has a larger pore size.

The operation of the example lubrication injection apparatus 234 for injecting lubricant at the housing 16 will now be described. Lubricant stored in the lubricant reservoir 236 is pumped by the lubricant pump 238 along the lubricant conduit 239 to the inlet 242. Lubricant passes through the inlet 242 into the housing 16. Lubricant collects in the manifold 244 along a length and width of the housing 16. Lubricant from the manifold 244 may then pass through the one or more lubrication ports 248 and through the porous sintered layer 250. Lubricant exiting the porous sintered layer 250 accumulates to form the lubricant film surface 252 on a surface of the housing 16. The lubricant film surface 252 may substantially coat the housing 16 and provide lubrication where the solid materials generate high forces. Friction between the solid material and housing 16 is therefore reduced. Furthermore, lubricant from the lubricant film surface 252 may coat the solid material upon coming into contact, such that the solid material passes the abutment member 30 and through the outlet 12 with a thin coating of lubricant. The thin coating of lubricant may assist in reducing friction between the solid material and the abutment member 30 and outlet 12.

Figure 8:
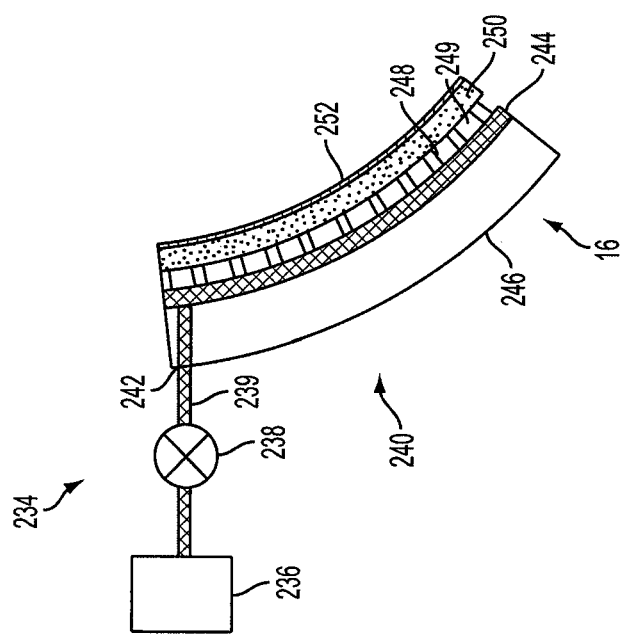
FIG. 8 is a sectional view of a second example housing of the lubricating pump system of FIG. 1, with a lubrication injection apparatus having a plate with lubrication ports at the housing and with some components schematically shown.

Referring now to FIG. 8, yet another example of a lubrication injection apparatus 234' is shown. In this example, the lubrication injection apparatus 234' is provided without a porous sintered layer. The inlet 242, manifold 244, lubrication ports 248, and plate 249 are identical or substantially similar to the example lubrication injection apparatus 234 in FIG. 7. Thus identical reference numerals are used. In this example, lubricant may be pumped by the lubricant pump 238 from the lubricant reservoir 236 along the lubricant conduit 239 to the inlet 242. Again, same reference numerals are used for identical/similar structures. Lubricant enters the lubrication injector 240' through the inlet 242 and collects in the manifold 244. The manifold 244 may extend partially or completely along the length and width of the housing 16.

Lubricant may accumulate in the manifold 244 and pass through the one or more lubrication ports 248. The lubrication ports 248 are formed in a plate 249, which can be attached to the surface of the manifold 244. The lubrication ports 248 may have a number of shapes and sizes. For instance, the lubrication ports 248 may be angled or may extend perpendicular to the manifold 244. Similarly, the lubrication ports 248 may be shaped as a circle, oval, square, slot, triangle, etc. depending on the application. Lubricant exiting the lubrication ports 248 may then accumulate on the surface of the plate 249. The lubricant film surface 252 is formed on the surface of the plate 249, thus ensuring a coating of lubricant on a surface of the housing 16 (e.g., a surface portion of the pump 11 along which material is transported/conveyed).

Examples of the lubrication injection apparatus shown in FIGS. 3 and 4 are adapted for use in the outlet 12 of the lubricating pump system 10. Examples of the lubrication injection apparatus shown in FIGS. 5 and 6 are adapted for use in the abutment member 30 of the lubricating pump system 10. Examples of the lubrication injection apparatus shown in FIGS. 7 and 8 are adapted for use in the housing 16 of the lubricating pump system 10. However, it is to be understood that the lubrication injection apparatus could be placed at other locations within the lubricating pump system 10.

In another example, lubricant can be injected through the rotor 28, upstream from the outlet 12, abutment member 30, and housing 16. In this example, lubricant can be injected by a lubrication injection apparatus 340 through an end of the rotor 28 such that lubricant coats the rotor 28 in the transport channels 24-26. As with the previous examples, the lubrication injection apparatus may include an inlet, a manifold, one or more lubrication ports formed in a plate, and, optionally, a sintered mesh. The inlet, formed at an end of the rotor 28, allows lubricant to pass through and accumulate in the manifold. The manifold may extend partially or completely along the length of the rotor. Lubricant in the rotor may then pass through the lubrication ports, oriented perpendicularly to the manifold. In one example, the sintered mesh may be provided on the surface of the lubrication ports, thus allowing the lubricant to pass from the lubrication ports through the sintered mesh. A lubricant film surface would then form on the surface of the sintered mesh. Alternatively, the lubrication injection apparatus may not include the sintered mesh, such that the lubricant passes through the lubrication ports and accumulates on the surface of the plate.

In at least some of the examples described, a lubricant film surface will form on an outer diameter of the rotor 28 in the transport channels 24-26. Thus, any solid material that comes into contact with the lubricant film surface may become coated with lubricant. The solid material may be coated with the lubricant as the solid material passes through the lubricating pump system 10, along the abutment member 30, and out of the outlet 12. By being coated with the lubricant, friction between the solid material and any surfaces may be reduced.

As stated above, a pump system without lubrication generates higher loads on the walls of the pumps due to friction between the walls and solid material. The high loads create excessive power requirements from the pump motor and cause excessive wear of solid materials and the wall. By providing a lubricant film surface in the lubricating pump system 10, friction between the solid materials and the walls is reduced, thus reducing wear and tear within the pump. Therefore, the lubricating pump system 10 can have a smaller motor, thinner walls, lighter weight, and greater efficiency. Moreover, the lubricating pump system 10 will be able to accommodate more abrasive materials.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A lubricating pump system including:
   a pump, for conveying solid material by means of relatively moving portions within the pump;
   a lubricant reservoir for storing a lubricant; and
   a lubrication injection apparatus for delivering lubricant from the lubricant reservoir to a surface portion of a part of the pump along which solid material is engaged and conveyed, wherein the lubrication injection apparatus includes a manifold within which lubricant accumulates, the manifold being located within the part of the pump having the surface portion along which the solid material is engaged and conveyed, lubricant passes through the manifold to form a lubricant film surface on the surface portion along which the solid material is engaged and conveyed.

2. The lubricating pump system of claim 1, wherein the lubrication injection apparatus includes a porous sintered layer that provides the surface portion of the pump, wherein lubricant passes through the porous sintered layer to form a lubricant film surface on the porous sintered layer.

3. The lubricating pump system of claim 1, wherein the lubrication injection apparatus includes a plate adapted to be positioned adjacent to the manifold.

4. The lubricating pump system of claim 3, wherein the plate includes at least one lubrication port in fluid communication with the manifold, the at least one lubrication port being adapted to allow lubricant to pass from the manifold, through the at least one lubrication port, to form the lubricant film surface.

5. The lubricating pump system of claim 1, wherein the surface portion of the pump to which the lubrication injection apparatus delivers lubricant is positioned at an outlet of the pump.

6. The lubricating pump system of claim 1, wherein the surface portion of the pump to which the lubrication injection apparatus delivers lubricant is positioned at an abutment member of the pump.

7. The lubricating pump system of claim 1, wherein the surface portion of the pump to which the lubrication injection apparatus delivers lubricant is positioned at a housing of the pump.

8. The lubricating pump system of claim 1, wherein the surface portion of the pump to which the lubrication injection apparatus delivers lubricant is positioned at a rotor of the pump.

9. The lubricating pump system of claim 1, wherein the surface portion of the pump to which the lubrication injection apparatus delivers lubricant engages material being transported by the lubricating pump system.

10. The lubricating pump system of claim 1, wherein the surface portion of the pump to which the lubrication injection apparatus delivers lubricant is located at a static portion of the pump.

11. The lubricating pump system of claim 1, wherein the surface portion of the pump to which the lubrication injection apparatus delivers lubricant is located at a moving portion of the pump.

12. The lubricating pump system of claim 1, further including a lubricant pump for pumping lubricant from the lubricant reservoir to the lubrication injection apparatus.

13. A lubrication injection apparatus for a pump, the lubrication injection apparatus including:
    a surface portion that is on a part of the pump and along which solid material is engaged and conveyed by relatively moving portions of the pump;
    a lubricant reservoir for storing a lubricant; and
    means for delivering lubricant from the lubricant reservoir to the surface portion along which solid material is conveyed, wherein the lubrication injection apparatus includes a manifold within which lubricant accumulates, the manifold being located within the part of the pump having the surface portion along which the solid material is engaged and conveyed, lubricant passes through the manifold to form a lubricant film surface on the surface portion of the pump along which the solid material is engaged conveyed.

14. The lubrication injection apparatus of claim 13, further including:
    an inlet for receiving the lubricant; and
    a porous sintered layer in fluid communication with the inlet;
    wherein lubricant is adapted to flow from the inlet and through the porous sintered layer to form a lubricant film surface on the porous sintered layer.

15. The lubrication injection apparatus of claim 14, further including a plate adapted to be positioned between the porous sintered layer and the manifold, wherein the plate includes at least one lubrication port in fluid communication with the manifold and the porous sintered layer, the at least one lubrication port being adapted to allow lubricant to pass from the manifold, through the at least one lubrication port, to the porous sintered layer.

16. The lubrication injection apparatus of claim 14, wherein the inlet and the porous sintered layer are at an outlet of the pump.

17. The lubrication injection apparatus of claim 14, wherein the inlet and the porous sintered layer are at an abutment member of the pump.

18. The lubrication injection apparatus of claim 14, wherein the inlet and the porous sintered layer are at a housing of the pump.

* * * * *